Nov. 7, 1939.  E. C. McCLURE  2,178,913
CALCULATING MACHINE
Filed Sept. 2, 1936  9 Sheets-Sheet 4

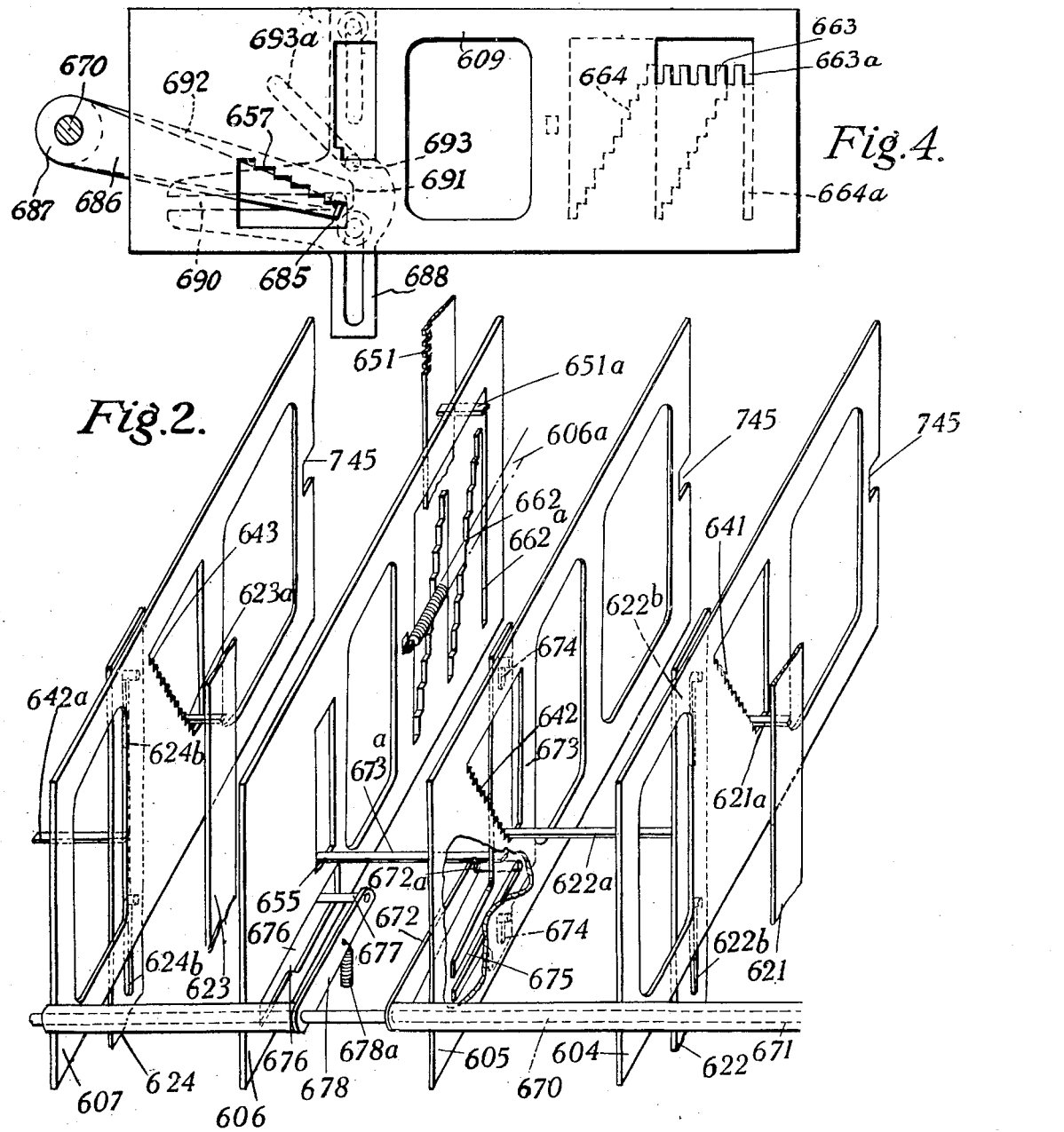

Inventor
Ernest C. McClure
by [signature]
Atty

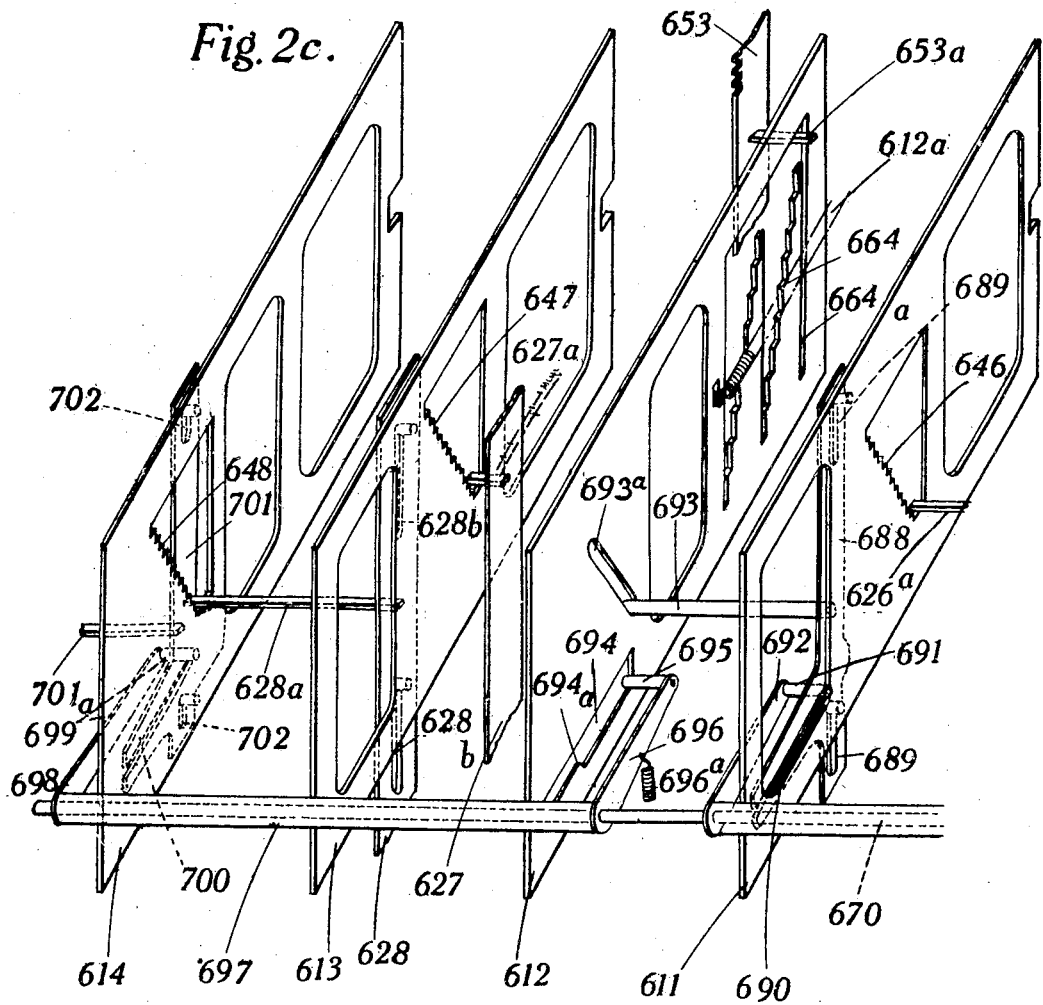

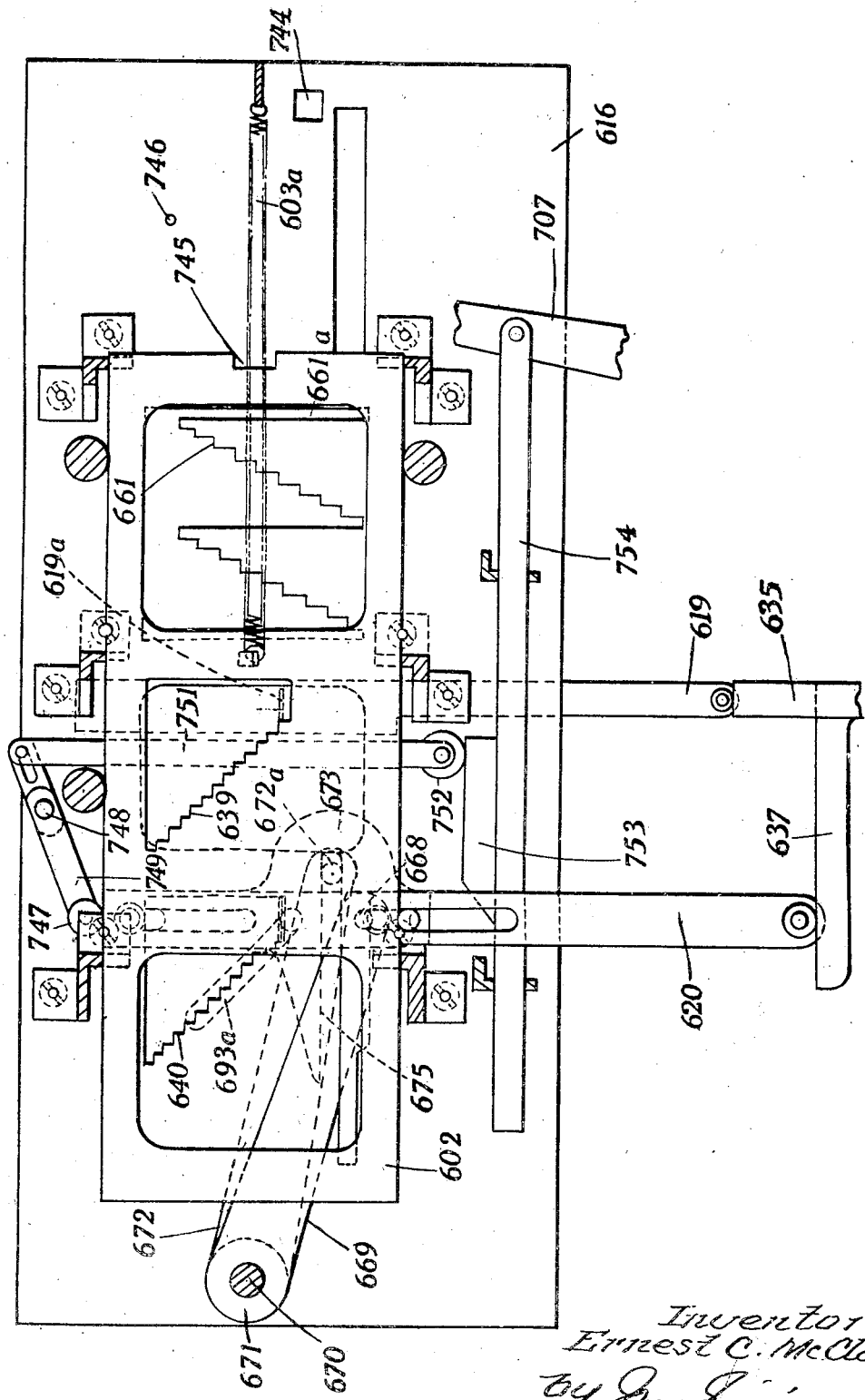

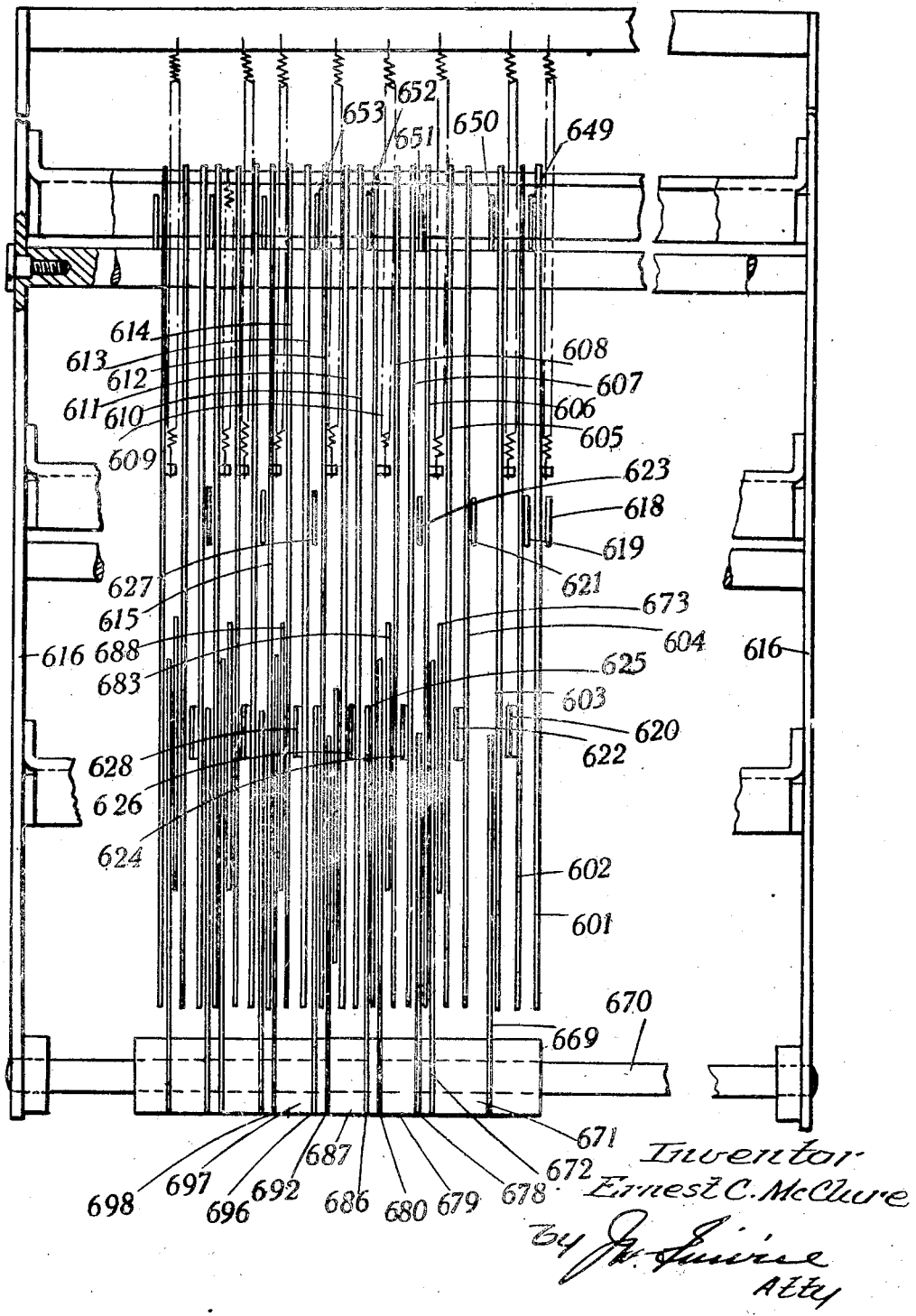

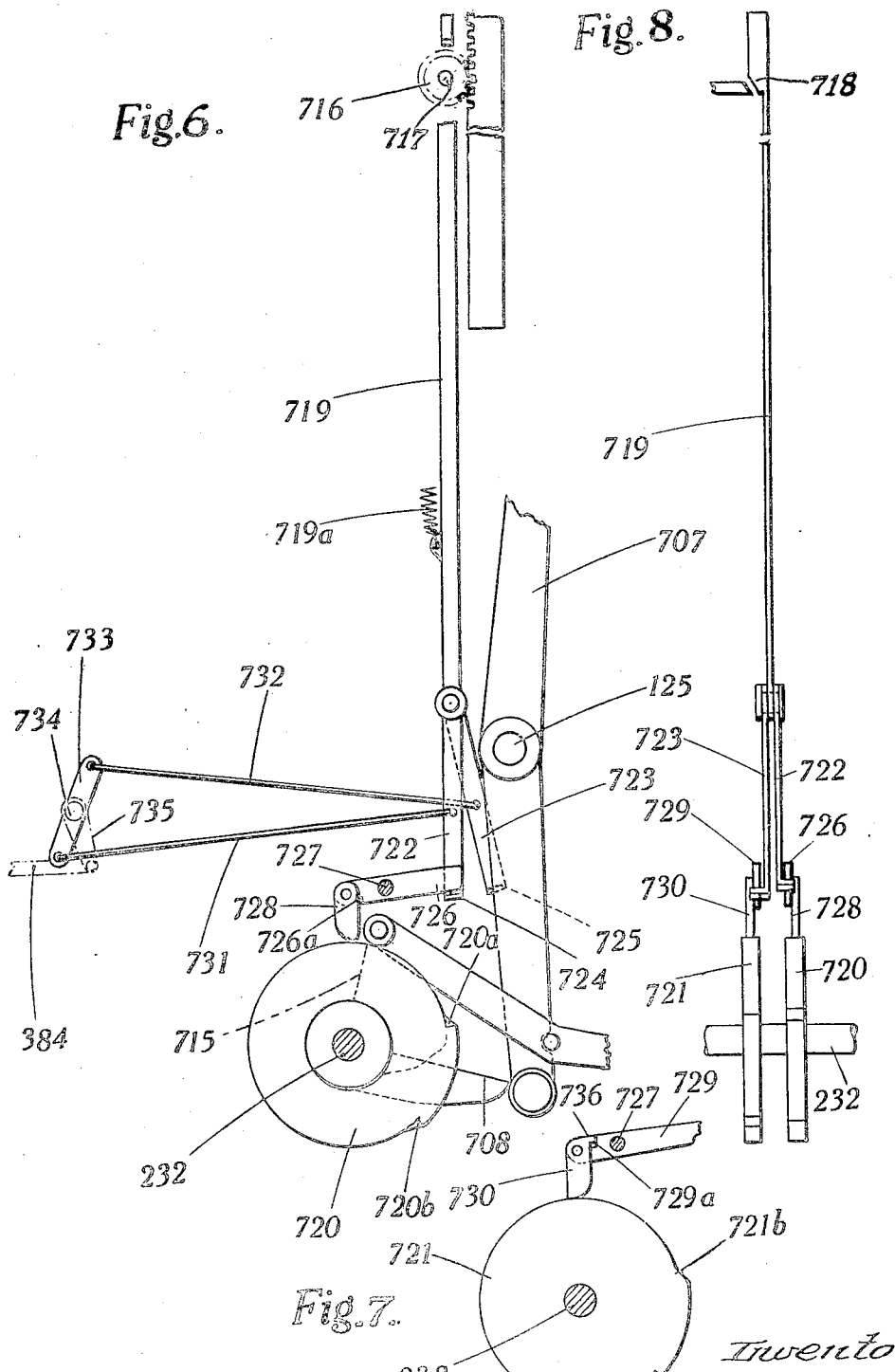

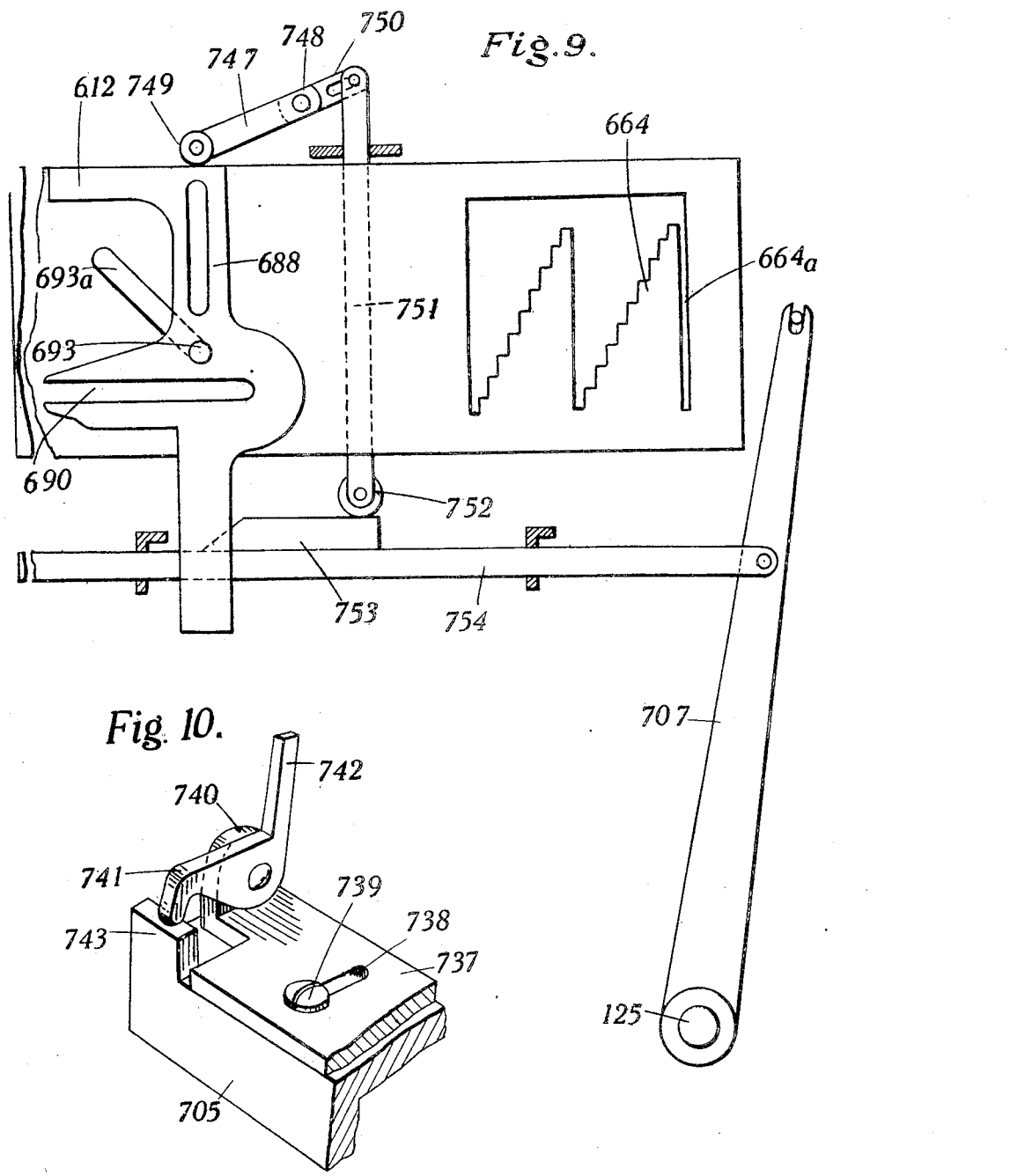

Patented Nov. 7, 1939

2,178,913

UNITED STATES PATENT OFFICE 2,178,913

CALCULATING MACHINE

Ernest Charles McClure, Wahroonga, New South Wales, Australia, assignor to Powers Accounting Machines, Limited, London, England Application September 2, 1936, Serial No. 99,155
In Great Britain September 5, 1935

4 Claims. (Cl. 235—61)

This invention relates to machines for multiplying two factors and has for its object to provide a mechanism for accumulating the different components of the partial products obtained from such a multiplication.

According to the invention mechanism for accumulating the partial products obtained from the multiplication of two factors comprises in combination a frame, a plurality of accumulator plates pertaining to a single denomination of the product, said plates being slidably mounted in said frame, a settable stop for one of said plates, said stop being mounted on the frame, a settable stop for the adjacent plate, said second mentioned stop being carried on said first mentioned plate, means for setting said stops and means for maintaining the stop which is carried on said first mentioned plate in operative relation with the setting means irrespective of the position of the plate on which said stop is carried.

In order to render the invention clear one construction according thereto will now be described as applied to a sterling multiplying machine as described in British patent specification No. 440,180, (corresponding to United States Patent No. 2,113,352, dated April 5, 1938,) with reference to the accompanying drawings in which:

Fig. 1 illustrates the mechanism in outside elevation with one side plate of the frame removed;

Figs. 2, 2a, 2b, 2c together show diagrammatically the arrangement of the plates of the mechanism according to the invention which receives the different components of the partial products;

Fig. 3 is a side elevation with the lowest denominational plate removed;

Fig. 4 is a view showing the tens of shillings final product plate and associated mechanism for transferring one or more units to the units of pounds denomination;

Fig. 5 is a plan of the mechanism of the invention;

Figs. 6, 7 and 8 show the mechanism for controlling a register to which the final products are transferred;

Fig. 9 shows mechanism for controlling the final product plate of the units of pounds denomination; and Fig. 10 shows the construction of the restoring bar for returning all the plates to their normal position.

In order to facilitate understanding of the invention those parts of the machine which also appear in British patent specification No. 440,180 will be referred to in this specification by the same reference numerals as those which they bear in British specification No. 440,180.

Figure 1:
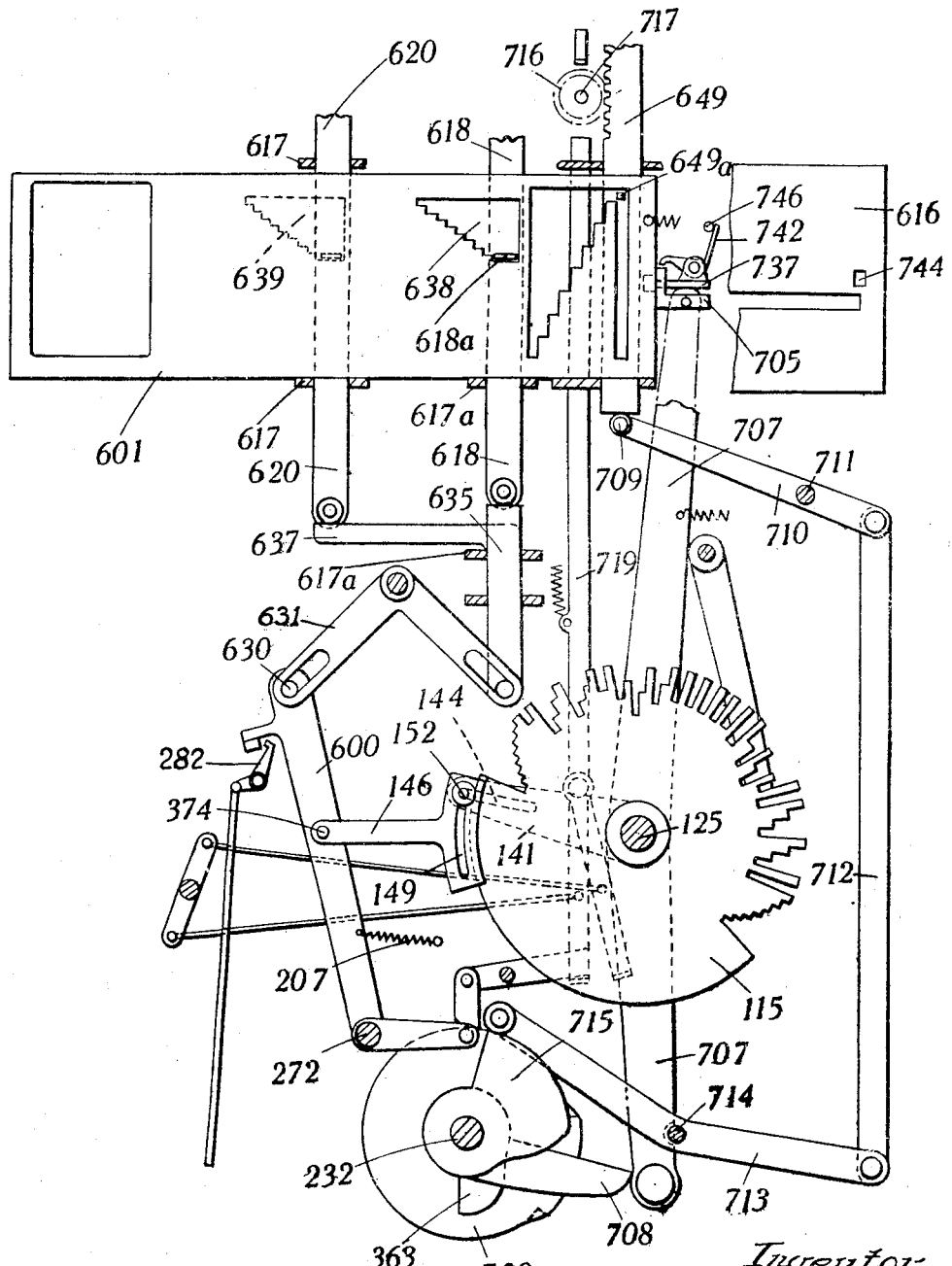

In the construction shown in the drawings the denominational pairs of quadrantal racks 150 and 151 described in British specification No. 440,180 are replaced by denominational pairs of arms 600 which are pivoted on the shaft 272 and to which are pivoted at 374 the connecting plates 146 and 147, each of which has a slot 149, 149a in which rides a pin 152. As described in British patent specification No. 440,180 the pins 152 also slide in slots 144, 144a formed in radial arms 141, 142 of bell crank levers which are set from the multiplier keys 64.

When the pins 152 have been positioned by the keys 64 as described in British patent specification No. 440,180 the arms 600 of all the denominations are released to the action of springs 207 and swing clockwise until their pins 152 reach the bottoms of the slots in the respective partial product plates 115, 115a, 116, 116a and so on.

As explained in British patent specification No. 440,180 these partial product plates are disposed in pairs, one pair for each sterling denomination.

In each pair one plate, e. g., 115, gives the component in the denomination concerned of a multiple of a multiplicand digit in the same denomination while the other plate, e. g., 115a, gives the component in the next higher denomination of the same multiple.

Thus after the pins 152 have reached the bottom of the slots presented to them by the corresponding partial product plates the corresponding arms 600 will be positioned to represent different components of the final product.

The object of the present invention is to provide a mechanism for adding these components together to give the final product.

In the machine described in British patent specification No. 440,180 the pins 152 were normally disposed just clear of the peripheries of their respective partial product plates 115, 115a and so on, so that when one of the partial product plates was set to represent zero the corresponding pin 152 did not move at all.

When the mechanism according to the present invention is applied to the machine described in British patent specification No. 440,180 however, certain of the pins 152 are normally disposed at a distance from the periphery of their respective partial product plates such that when the said partial product plates are set to represent zero, the corresponding pins 152 move to an extent representing one unit before being arrested by engaging the periphery of the plates.

The purpose of this one unit extra movement will be explained later.

The mechanism of the invention comprises a series of sliding plates 601 to 614 mounted in a frame 616 which is attached to the side plates of the machine described in British patent specification No. 440,180.

Mounted to slide vertically in comb bars of which the ends are carried by the side plates of the frame 616 is a series of vertical rods 618 to 628, one for each of the arms 600. Each rod 60

618 to 628 is pulled down by a spring and is lifted under the control of the corresponding arm 600 by the following mechanism (see Fig. 1).

The upper end of each arm 600 is pivoted at 630 to one arm of a bell crank 631 freely pivoted on a rod 632 mounted transversely between the side plates of frame 616.

The lower ends of the rods 618, 619, 621, 623, 626 and 627 (Figs. 2, 2a, 2b and 2c) rest on the upper ends of rods 635 pivoted to their corresponding bell cranks, as shown for the rod 618 in Fig. 1. The rods 620, 622, 624, 625 and 628 however are displaced from the other rods, and the lower end of each of these rods rests on a lateral extension 637 of the corresponding vertical slide 635 which has its lower end pivoted to the corresponding bell crank 631.

Thus when an arm 600 moves clockwise and is positioned by its corresponding pin 152 coming to rest on a step of the corresponding partial product plate 115, etc., the corresponding rod 618 to 628 will be raised to an extent representing the digit represented by the movement of the corresponding arm 600.

The action of the rods 618 to 628, which may conveniently be termed setting rods, is best explained by reference to the rod 618 and the plate 601 shown in Fig. 1 which handle the ⅛d. component of a multiple of eighths of a penny.

The plate 601 has a series of steps 638 formed therein and the rod 618 carries a projection 618a which is normally in a position such that it is engaged by the vertical face of the lowermost of the steps 638 as shown in Fig. 1.

If the pin 152 which co-operates with the partial product plate 115 (which is stepped to represent ⅛d. components of multiples of eighths of a penny) moves to an extent representing 3 digits then the corresponding arm 600 will move to an extent representing 4 digits and the projection 618a will be positioned so that when the plate 601 moves to the right in the manner explained later, the vertical face of the fourth step 638 from the bottom will engage the projection 618a and arrest the plate 601 after a movement representing 4 digits.

In order to explain the manner in which all the plates 601 to 614 co-operate reference will now be made to Figs. 2, 2a, 2b and 2c which show these plates and their associated parts diagrammatically in perspective, and the operations involved in accumulating the partial products obtained from the multiplication of the amount £24:15:10¾d. by 7 will be described. Since the machine is arranged to operate in eighths of a penny, the amount of ¾d. included in the above multiplicand £24:15:10¾d. will be dealt with as 6/8d., i. e. 6 digits in the eighths of a penny denomination.

The partial products obtained from this multiplication are as follows:

| | £ 100 | £ 10 | £ units | Shillings tens | Shillings units | Pence | ⅛d. |
|---|---|---|---|---|---|---|---|
| ¾d.×7 | | | | | | 5 | 2 |
| 10 d.×7 | | | | | 5 | 10 | |
| 5sh.×7 | | | | 3 | 5 | | |
| 10sh.×7 | | | | 3 | 1 | | |
| £4×7 | | | 2 | 8 | | | |
| £20×7 | 1 | 4 | | | | | |

All these components have to be added together in their correct denominations in order to obtain the final product, and it will be observed that in certain denominations the sum of the two components is greater than the maximum number of units in that denomination so that one unit has to be transferred to the higher denomination.

In the mechanism according to the invention, as will now be explained with reference to Figs. 2, 2a, 2b and 2c means is provided for effecting these transfers from one denomination to a higher denomination when necessary.

Referring now to Figs. 2, 2a, 2b and 2c and assuming that the partial product plates 115, 115a and so on have been set to represent the partial products of the multiplication of £24:15:10¾×7 then the different arms 600 of which there is one for each partial product plate, will move clockwise to extents representing the various partial products set out above but certain of arms 600 as will be explained more fully hereinafter commencing with the arm corresponding to the partial product plate 115 will move one additional unit as well.

The arms 600 having all been positioned by the entry of their corresponding pins 152 into the notches in the partial product plates which have been presented to them, the arm 600 for the eighths of a penny component of a multiple of eighths of a penny will have moved clockwise to an extent representing 2+1=3 digits and therefore the corresponding setting rods 618 will have arisen to an extent equal to the height of three of the steps 638 in the plate 601.

The height of the steps 638 equals the width of these steps, so that when the plate 601 moves rearwardly under the action of a spring 601a, as described later, the vertical face of the third step from the bottom will engage the projection 618a on the rod 618 and will arrest the plate 601.

It is required to transfer this amount of 2 eighths of a penny to the eighths of a penny denominational wheel of a final product register and to this end, an actuator rack 649 for this wheel is provided which is set from the plate 601 in the following manner:

The plate 601 is provided with a second series of steps 660 and co-operating with these steps is a projection 649a on the rack 649. This projection 649a is normally at the top of a slot 660a formed in the plate 601 adjacent the steps 660 and of a depth such that the bottom of the slot 660a is level with the bottom of the lowermost of the steps 660. The purpose of this slot is to permit lowering of the rack 649 in order to clear the register, and the operation of clearing the register will be described later.

The highest of the steps 660 is the No. 0 step, the next lower step is the No. 1 step, the third step is the No. 2 step and so on.

As described above the plate 601 has been arrested by the third step 638 from the bottom engaging the projection 618a on the setting rod 618, and this position of the plate 601 brings the third step 660 from the right directly below the projection 649a on the actuator rack 649.

The rack 649 is then lowered by mechanism which will be described later and is arrested by its projection 649a engaging with the third step 660 from the right. This is the No. 2 step and accordingly the position of the actuator 649 represents 2 digits, i. e., 2 eighths of one penny.

It will be noted that the projection 649a is normally one step to the right of the No. 0 step (the highest step 660) and that therefore a movement of plate 601 to the right of one step is required to bring the 0 step below the projection 649a. It is for this reason that the corresponding arm 600 is permitted to move to an extent representing the actual digit involved plus one unit.

In the foregoing example the plate 601 moved 3 steps but the actuator 649 has been set to represent 2 eighths of one penny.

After the actuator 649 has thus been set, the corresponding register wheel is moved into engagement with the teeth on said actuator and the latter is returned to normal position, whereby the amount of 2/8d. is transferred to the register wheel in the eighths of a penny denomination.

As already shown the pence component of the product of 3/4d.(6/8d.) ×7 is 5d., and consequently the arm 600 for the pence component of a multiple of eighths of a penny will have moved clockwise to the extent of 5 units and accordingly the corresponding setting rod 619 will have arisen to an extent equal to the height of five of the steps 639 in the corresponding plate 602.

Since this plate 602 only handles the pence components of multiples of eighths of a penny, and not the pence digit of the final product, the plate 602 is not provided with steps such as the steps 660 in the plate 601, or with an actuator rack for operating a register wheel.

The plate 602 merely serves to transfer to the next plate 603 the pence component 5 of the product of the amount 3/4d.(6/8d.)×7.

This plate 603 receives the pence component of the pence digit of the multiplicand multiplied by 7 and also the pence component of the eighths of a penny multiple from the plate 602.

To this end the setting rod 620 for the plate 603 is mounted to slide vertically on the plate 602 by means of pins and slots 620b so that when the plate 602 moves to the right, the setting rod 620 for the plate 603 moves with it and the plate 603 also to the same extent.

It will be observed that although the rod 620 moves laterally with the plate 602 the corresponding arm 600 can still transmit vertical movement to the rod 620 since as the latter moves with the plate 602 it slides along the lateral extension 637 of the corresponding vertical slide 635.

As stated above the vertical rod 619 has moved up to the extent of 5 steps 639 and therefore the plate 603 will move 5 steps to the right before it is arrested by the projection 619a on rod 619, carrying with it also the rod 620 which through its projection 620a carries the plate 603 also 6 steps to the right.

The pence component of the pence digit (10d.) of the multiplicand multiplied by 7 is 10d.(10d.×7=70d.=5 sh. 10d.).

Therefore the arm 600 corresponding to the partial product plate 116 will move clockwise to the extent of 10+1=11 units and the corresponding setting rod 620 will move up 11 steps until its projection 620a is opposite to the eleventh step from the bottom of a series of steps 640 formed in the plate 603.

The plate 603 will therefore move to the right a further eleven steps but since the plate 603 has already moved five steps simultaneously with the plate 602, the total movement of plate 603 is 11+5=16 steps.

This movement of 16 steps actually represents 15 pence since one step movement is required to bring the 0 step of the steps 661 below the projection 650a on the corresponding actuator 650. But 15d.=1 sh. 3d., and therefore it is necessary to set the actuator 650 to represent 3d. and to carry 1 unit to the units of shillings denomination.

The maximum possible amount of pence which can be received by the plate 603 is 11d. through the setting rod 620 and 7d. through the plate 602, 7d. being the maximum possible pence component of any multiple of eighths of a penny (7/8d.×9=7 7/8d.). Therefore the maximum movement of plate 603 is 11+7+1=19 steps, which would represent 18d.=1 sh. 6d.

In order to transfer the pence digit of the final product to the corresponding register wheel, two series of steps indicated at 661 are provided in the plate 603 for co-operation with the projection 650a on the corresponding actuator 650.

In the first series there are twelve steps representing 0, 1, 2, 3, 4, 5, 6, 7, 8, 9, 10 and 11 pence respectively and in the second series there are seven steps representing 0, 1, 2, 3, 4, 5 and 6 pence respectively.

In the present example the plate 603 has moved 16 steps and therefore the fourth step in the second series of steps 661 representing 3d. will be brought below the projection 650a on the actuator 650, which will consequently be set to 3d.

In order to transfer the required one unit to the shillings denomination the plate 603 is provided with a slot 667 of the form shown with which engages a pin 668 on an arm 669 secured to a sleeve 671 rotatably mounted on a shaft 670 secured to the frame 619.

Figure 2A:
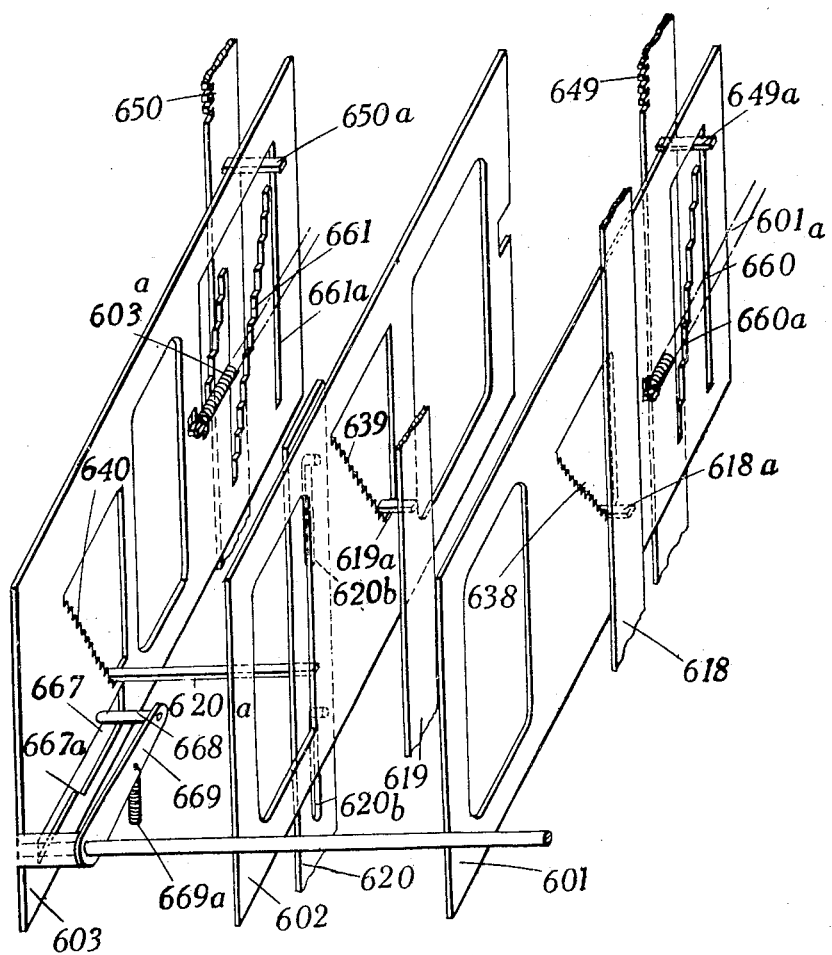

In the plan view (Fig. 5) the arm 669 is shown to the left of plate 603 but in the perspective view shown in Figs. 2, 2a the arm 669 is shown to the right of the plate 603 for the sake of clearness.

The slot 667 is formed with a cam portion 667a so located that if the plate 603 moves to the right more than 12 steps, i. e., registers more than 11d., then the pin 668 rides up the cam 667a against the action of a spring 669a and rocks the sleeve 671.

The rocking of the sleeve 671 transfers 1 shilling to the units of shillings denomination by means of mechanism which will be described later.

In the aforementioned example of the multiplication of £24:15:10 3/4×7 the arm 600 for the units of shillings component of the pence multiple will have moved clockwise to the extent of 5+1 units=6 units and therefore the corresponding setting rod 621 will have risen six steps to bring its projection 621a into line with the 6th step from the bottom of a series of steps 641 formed in the plate 604 which receives the units of shillings component of a multiple of pence. When this plate 604 moves to the right it will therefore be arrested after a movement equal to the width of six of the steps 641.

In order to handle the units of shillings component of any multiple of a units of shillings digit of a multiplicand a plate 605 is provided, of which the operation is as follows:

The units of shillings component of the pence multiple and the units of shillings component of the units of shillings multiple have to be added together to give the units of shillings digit of the final product but, as in the present case the sum of the two pence components amounted to more than 11d., a further 1 shilling has to be added in the units of shillings denomination.

As explained above the plate 604 for the units of shillings component of the pence multiple will in the present example move six steps to the right. Mounted to slide vertically on this plate 604 is the setting rod 622 for the units of shillings component of multiples of units of shillings. This rod 622 is mounted on the plate 604 by means of slots 622b engaging pins projecting from the plate 604. The rod 622 carries a projection 622a engaging in a series of steps 642 formed in the plate 605 referred to above so that when the plate 604 moves to the right six steps the plate 605 also moves to the right six steps.

Since, however, the units of shillings component of the product of the units of shillings digit 5×7 is 5, accordingly the corresponding arm 600 will have moved forward 6 steps and will have lifted the setting rod 622 for the plate 605 to the extent of 5 steps. In this connection it should be noted that the three plates 604, 605 and 606 together serve to set a single actuator rack 651 which takes its setting from the plate 606 and therefore it is only necessary for one of the plates 604, 605 or 606 to make the one extra step movement necessary to bring the plate 606 from the position in which the slot 662a is below the projection 651a to the position in which the nought step 662 is below this projection 651a. Since the plate 604 has made this one extra step movement it is not necessary for the plate 605 or for the plate 606 to move an extra step.

Therefore, as explained above, the setting rod 622 for the plate 605 rises only five steps and therefore when the plate 605 moves to the right it will move until the fifth step 642 engages the projection 622a on the rod 622 whereby the plate 605 will have moved five steps to the right in respect to the plate 604. But the plate 604 has already moved six steps to the right so that the total movement of the plate 605 is eleven steps to the right.

Mounted to slide vertically on the plate 605 is a slide 673. This slide is provided with slots 674 engaging with pins carried by the plate 605 and engaging in a slot 675 formed in the slide 673 is a pin 672a carried on an arm 672 secured to the sleeve 671.

It will be remembered that in the case of the pence plate 603 this plate had moved to an extent greater than 11d. and accordingly the pin 668 on the arm 669 secured to the other end of the sleeve 671 has ridden up the cam surface 667a of the slot 667 thereby rocking the sleeve 671. This rocking movement of the sleeve 671 lifts the arm 672 secured thereto and through the pin 672a on the end thereof lifts the slide 673.

Secured to the slide 673 is a lateral projection 673a which normally engages with the vertical surface of a step 655 formed in the units of shillings product plate 606. When the slide 673 is lifted the projection 673a moves upwards to the extent of the height of the step 655 and permits the plate 606 to move one step to the right, as will readily be seen from the drawings.

As already mentioned the plate 605 has moved to the right to the extent of eleven steps and has therefore carried with it the slide 673 and therefore also the plate 606 which is connected to the slide 673 by the projection 673a. In addition however, the slide 673 has been raised one step by the rocking of the sleeve 671 and consequently the plate 606 has moved one step further to the right, making twelve steps in all.

In this connection it will be noticed that the slot 675 in the slide 673 is of sufficient length to permit the pin 672a to remain in engagement therewith throughout the maximum possible travel of the plate 605.

The amount represented by this twelve step movement of the plate 606 has now to be transferred to the units of shillings wheel of the final product register and to this end the plate 606 is provided with two series of ten steps 662 with which co-operate a projection 651a on the actuator rack 651 for the units of shillings register wheel. The projection 651a is normally over the deep slot 662a in the plate 606 and therefore of the twelve steps movement the first step is merely for the purpose of bringing the projection 651a over the nought step in the plate 606. Consequently the actual movement of the plate 606 is only representative of eleven shillings. This amount of eleven shillings is made up of one unit in the shillings denomination and one unit in the tens of shillings denomination and therefore the twelve steps movement of the plate 606 must set the actuator 651 to represent one shilling and must at the same time transfer one unit to the tens of shillings denomination. Since the plate 606 has moved 12 steps the second step in the second series of steps 662 representing 1 shilling will be brought below the projection 651a on the actuator 651 which will consequently be set to 1 shilling.

In order to transfer the required 1 unit to the tens of shillings denomination the plate 606 is provided with a slot 676 similar to the slot 667 in the pence plate 603. With this slot 676 engages a pin 677 carried on an arm 678 secured to a sleeve 679 freely mounted on the shaft 670 (Fig. 5). The slot 676 is formed with a cam portion 676a so located that if the plate 606 moves to the right more than 10 steps, i. e., registers more than 9 shillings, then the pin 677 rides up the cam 676a against the action of a spring 678a and rocks the sleeve 679. The rocking of the sleeve 679 transfers one unit to the tens of shillings denomination by means of mechanism similar to that already described in connection with the transfer of 1 shilling from the pence to the units of shillings denomination.

Considering now the tens of shillings denomination. The tens of shillings digit in the final product is made up of two components, namely the tens of shillings component of the units of shillings multiple and the tens of shillings component of the tens of shillings multiple. In the present example the tens of shillings component of the units of shillings multiple is 3 (5 sh.×7=35 sh.) while the tens of shillings component of then tens of shillings multiple is 1 (10 sh.×7= £3.10.0.).

Accordingly the arm 600 associated with the partial product plate 111a which carries steps representing tens of shillings components of a shillings multiple will move clockwise 3+1 steps. Consequently the corresponding setting rod 623 will have risen to an extent equal to the height of 4 of the steps 643 in the corresponding plate 607. The adjacent plate 608 receives the tens of shillings component of the tens of shillings digit of the multiplicand multiplied by 7 and also the tens of shilings component of the units of shillings digit of the multiplicand multiplied by 7. Therefore the setting rod 624 for the plate 608 is mounted to slide vertically on the plate 607 by means of pins and slots 624b so that when the plate 607 moves to the right the setting rod 624 for the plate 608 moves with it and the plate 608 also to the same extent.

As stated above the setting rod 623 has moved up to the extent of 4 steps 643 and therefore the plate 607 will move 4 steps to the right before it is arrested by the projection 623a on rod 623 carrying with it also the setting rod 624 which through its projection 624a carries the adjoining plate 608 also 4 steps to the right.

The tens of shillings component of the tens of shillings digit 1 of the multiplicand multiplied by 7 is 1 (10 sh.×7=£3.10.0.). Therefore the arm 600 corresponding to the partial product plate 118 will move clockwise to the extent of 1 unit since the additional unit of movement required to bring the final product plate 609 for the tens of shillings denomination to the zero position has already been made by the plate 607. Accordingly the corresponding setting rod 624 will move up one step from the bottom of the series of steps 644 in the plate 608 and therefore the plate 608 will be permitted to move one step to the right relatively to the plate 607. Since the plate 607, however, has already moved 4 steps to the right the total movement of the plate 608 is 5 steps to the right.

It will be remembered however that the units of shillings final product plate 606 moved to an extent greater than 9 shillings and that therefore one unit has to be carried to the tens of shillings denomination and that this movement of the units of shillings plate 606 caused the sleeve 679 to rock.

This rocking movement of the sleeve 679 effects the transfer of one unit to the tens of shillings denomination by the following means:

Secured to the sleeve 679 is an arm 680 carrying a pin 681 engaging in a slot 682 formed in a slide 683 which is mounted to slide vertically on the plate 608 by means of pins and slots 684. This slide 683 carries a projection 683a engaging with a step 656 formed in the plate 609.

When the plate 608, as described above, moved through 5 steps plate 609 also moved through 5 steps together with it by virtue of the connection between plates 608 and 609 constituted by the projection 683a. The rocking of the sleeve 679 however raised the arm 680 and therefore the slide 683 so that the projection 683a was lifted to the extent of one step 656 thereby permitting the final product plate 609 to move one extra step, making six steps in all.

In order to transfer the tens of shillings digit of the final product to the corresponding register wheel a series of steps 663 is formed in the plate 609 for co-operation with a projection 652a on a corresponding actuator 652.

In the tens of shillings denomination only 1 or 0 can be registered and therefore the steps 663 are made to represent 0 and 1 alternately, there being provided the slot 663a adjacent the 0 step, with which slot the projection 652a is normally in register.

It will be understood that the maximum amount which the tens of shillings plate 609 can receive from the shillings denomination is 8 digits. These 8 digits however, which represent 80 shillings, equal £4.0.0. therefore provision must be made for carrying 4 digits to the units of pounds denomination when required. In addition, when the tens of shillings digit is an odd number not only must a carry be effected to the units of pounds but also the tens of shillings denomination must register 1, for example 30 shillings= £1.10.0. 50 shillings=£2.10.0. and so on. Accordingly the steps 663 are arranged in the following manner: 0, 1, 0, 1, 0, 1, 0, 1, 0, 1 and a further series of steps 657 is provided in the plate 609 with which engages a lug 685 carried on an arm 686 secured to a sleeve 687 rotatably mounted on the shaft 670 arm 686 is pulled upwardly by a spring which is not shown. When plate 609 moves until the lug 685 leaves one of the steps 657 and moves into engagement with the next, then the consequent rocking of sleeve 687 carries one unit to the units of pounds denomination.

Although each of the steps 657 is of the same height as that of the steps 644 each of the steps 657, with the exception of the lowermost, is double the width of a step 663 and the lowermost step 657 is three times the width of a step 663.

If the plate 609 is set so that the projection 652a is over the first or second of the steps 663 from the right then this indicates a value of 0 or 10 shillings and no carry to the units of pounds is necessary. Therefore the lowermost of the steps 657 must be of a width at least equal to twice the width of a step 663. Since, however, the plate 609 moves one step before the first of the steps 663 comes below the projection 652a the lowermost step 657 is made three times the width of one step 663.

If, however, the plate 609 moves until the projection 652a is over the third or fourth step 663 this indicates a product of 20 shillings or 30 shillings in both of which cases a carry over of one unit is required to the units of pounds denomination, therefore the second step 657 is made twice the width of one step 663 and likewise with all the other steps 657.

In the present example, as explained above, the tens of shillings plate 609 has moved six steps which will bring the sixth step 663 below the projection 652a on the tens of shillings actuator rack 652. Accordingly this rack will be set at 1, i. e., 10 shillings. At the same time the six steps movement of the plate 609 will have brought the lug 685 on arm 686 into engagement with the third step 657 from the bottom whereby the sleeve 687 will be rocked to transfer £2 to the units of pounds denomination by means of the mechanism which will be explained later.

In the aforementioned example of the multiplication of £24.15.10¾ by 7 the units of pounds component of the product of the tens of shillings digit is 3 (10 sh.×7=£3.10.0). Consequently the arm 600 for the units of pounds component of the tens of shillings multiple will have moved clockwise to the extent of 3+1 units=4 units and the corresponding setting rod 625 will therefore have risen four steps to bring its projection 625a into line with the fourth step from the bottom of a series of steps 645 formed in the plate 610 which receives the units of pounds component of a multiple of 10 shillings. When this plate 610 moves to the right it will therefore be arrested after a movement equal to the width of four of the steps 645.

In order to handle the units of pounds component of any multiple of a units of pounds digit of a multiplicand a plate 611 is provided of which the operation is as follows:

In the example now being dealt with the units of pounds component of the units of pounds digit 4 is 8 (£4×7=£28).

The units of pounds component of the tens of shillings multiple and the units of pounds component of the units of pounds multiple have to be added together to give the units of pounds digit of the final product but, as in the present case, the tens of shillings final product plate 609 moved to an extent representing £2.10.0, a further £2 has to be added in the units of pounds denomination. As already mentioned this carry-over of £2 is effected by means of the sleeve 687 while the units of pounds component of the tens of shillings multiple is received by the plate 610 and the unit of pounds component of the units of pounds multiple is received by the plate 611.

As explained above the plate 610 for the units of pounds component of the tens of shillings multiple will, in the present example, move four steps to the right. Mounted to slide vertically on this plate 610 is the setting rod 626 for the units of pounds component of multiples of units of pounds. This rod 626 is mounted on the plate 610 by means of slots 626b engaging pins projecting from the plate 610. The rod 626 carries the projection 626a engaging in a series of steps 646 formed in the plate 611 referred to above so that when the plate 610 moves to the right four steps the plate 611 also moves to the right four steps.

Since however the units of pounds component of the product of the units of pounds digit 4 multiplied by 7 is, as stated above, 8 accordingly the corresponding arm 600 will have moved forward 8 steps and will have lifted the setting rod 626 for the plate 611 to the extent of 8 steps and therefore when the plate 611 moves to the right it will move until the eighth step 646 engages the projection 626a on the rod 626 whereby the plate 611 will have moved eight steps to the right relatively to the plate 610. But the plate 610 has already moved four steps to the right so that the total movement of the plate 611 is twelve steps to the right.

Mounted to slide vertically on the plate 611 is a slide 688. This slide is provided with slots 689 engaging with pins carried by the plate 611, and engaging in a slot 690 formed in the slide 688 is a pin 691 carried on an arm 692 secured to the sleeve 687.

It will be remembered that in the case of the tens of shillings plate 609 this plate had moved to an extent which caused the lug 685 on the arm 686 to rise in engagement with the third step 657 in the plate 609. This rocking of the sleeve 687 lifts the slide 688 through the action of the pin 691 to an extent sufficient to carry £2 to the units of pounds final product plate 612.

In order to permit this movement of the plate 612 relatively to the plate 611 the plate 612 is provided with a cam slot 693a engaging with a pin 693 projecting from the slide 688 so that when the slide 688 is raised by the rocking of the sleeve 687 the action of the pin 693 on the slot 693a moves the plate 612 to the right relatively to the plate 611 by a number of steps dependent upon the particular step 657 with which the lug 685 is engaged.

As already mentioned the plate 611 has already moved to the right to the extent of twelve steps and has therefore carried with it the slide 688 and therefore also the plate 612 which is connected to the slide 688 by the pin 693. In addition however the slide 688 has been raised two steps by the rocking of the sleeve 687 and consequently the plate 612 has moved two steps further to the right making fourteen steps in all.

The amount represented by this fourteen step movement of the plate 612 has now to be transferred to the units of pounds wheel of the final product register and to this end the plate 612 is provided with the steps 664 arranged in two series, these steps co-operating with the projection 653a on the actuator rack 653 in the units of pounds register wheel.

In the present example the plate 612 has moved fourteen steps and therefore the fourth step in the second series of steps 664 representing £3 will be brought below the projection 653a on the actuator 653 which will consequently be set to £3.

In order to transfer the required one unit to the tens of pounds denomination the plate 612 is provided with a slot 694 similar to the slot 667 in the pence plate 603, with which co-operates a pin 695 and a sleeve 697 to transfer one unit to the tens of pounds denomination in a manner similar to that for the transfer of one shilling from the pence to the units of shillings denomination.

Figure 2B:
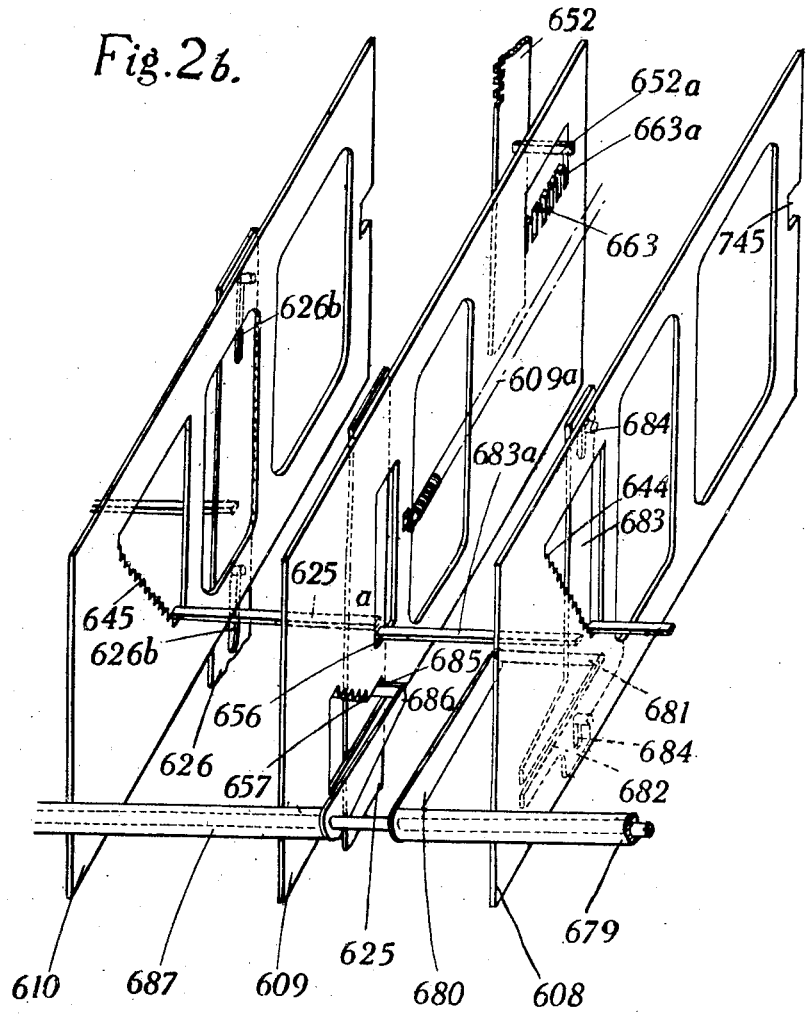

The plates which receive the tens of pounds components of the units of pounds multiple and of the tens of pounds multiple are respectively shown at 613 and 614 in Figs. 2b and 2c and the setting rods for these plates are shown at 627 and 628 while the mechanism for transferring one unit from the units of pounds to the tens of pounds denomination is shown at 697 to 702 in Figs. 2b and 2c. The tens of pounds final product plate 615 (Fig. 5) however is not shown, but from the foregoing description of the action of the mechanism in other denominations the operations involved in the tens of pounds denomination will be clear, as well as the operations in higher denominations; in each of which there are three plates of which two are similar to the plates 613 and 614 while the third is similar to the plate 615, which in turn is similar to the plate 612.

With regard to the precise number of steps in the various sets of steps in the plates which have just been described it is pointed out that for manufacturing reasons as many of the plates as possible will be made identical and where complete identity between the plates is not possible identity between the corresponding sets of steps will be preserved as far as possible. Hence the number of steps in the sets of steps 638, 639, 640, 641, 642, 643, 644, 645, 646, 647 and 648 is made equal to the maximum possible number of steps necessary in any one of these plates.

Similarly in the plates 603, 606, 612 and 615 the two series of steps in each plate, namely, 661, 662, 664 and 665 are each provided with ten steps although all of these steps in the second series in each set may not be required.

In order to actuate the arms 600 a cam 363 secured to the main shaft 232 is provided for each arm all these cams being disposed to actuate all the arms 600 simultaneously. The cams 362 described in British patent specification No. 440,180 are omitted in the present construction.

The final product plate in each denomination, e. g., plates 601, 603, 606, 609, 612 are all provided with springs 601a, 603a, and so on tending to pull them to the right whereby the other plates are also pulled to the right owing to the connection between these plates and the plates 601, 603 and so on associated with them. For example, spring 609a for plate 609 will pull plates 608 and 607 also. The plates are prevented from so moving by a restoring bar 705 carried between two arms 707 (of which only one is shown). These arms are pivoted on the shaft 125 and are extended below this shaft for actuation by a cam 708.

All the denominational actuator racks 649 to 653 are pulled downwardly by springs onto a bail 709 which normally maintains them in their highest position. The bail 709 is carried between two arms 710 pivoted to the side plates of the frame at 711 and connected by links 712 to two bell cranks 713 pivoted on a shaft 714, and each engaging a cam 715 (of which one only is shown) secured to the main shaft 232.

When the main shaft 232 rocks, the bail 709 descends and permits the actuator racks 649 to 653 as well as the racks of higher denomination to descend also under the action of their springs whereby these racks take up positions depending upon the particular step in the final result plates 601, 603, 606, 609, 612 and so on with which the corresponding projections 649a to 653a engage.

After the actuator racks 649 to 653 have been thus set the register wheels are brought into engagement therewith and the shaft 232 then rocks back again whereupon the cam 715 returns the bail 709 to its uppermost position thereby restoring the actuators 649 to 653 to their zero position. This return movement of the actuators transfers to the register wheels the amount to which the actuators have been set.

The register wheels indicated at 716 in Fig. 6 are carried on a shaft 717 which is slidable longitudinally in the side plates of the machine frame, the shaft being pressed by means of a spring not shown against a cam 718 carried on the upper end of a vertical rod 719.

The register wheels 716 are normally disposed to one side of their respective actuators 649 to 652 so that the teeth of the register wheels are out of engagement with the teeth of the actuators. In order to bring the register wheels into engagement with the actuators the rod 719 is pulled downwardly whereupon the cam 718 displaces the register shaft 717 longitudinally until the register wheels 716 engage with the actuator racks.

In order to operate the rod 719 a pair of cams 720, 721 is provided on the main shaft 232. These cams have the same contour but are reversed relatively to one another and means is provided for bringing the rod 719 into operative relationship with the cam 720 when the shaft 232 rocks in one direction and into operative relationship with the cam 721 when the shaft 232 rocks back again.

It will be understood that the provision of two cams 720, 721 is required in view of the fact that in the machine described in British patent specification No. 440,180 to which the present invention is applied, operation of the machine is effected by pulling the operating handle forwardly and allowing it to return under the action of a spring so that the movement of the main shaft 232 is a rocking movement and the shaft therefore does not make a complete revolution.

In order to operate the rod 719 from the two cams 720, 721 two fingers 722, 723 are pivoted to the lower end of the shaft 719. Each of these fingers has a lug 724, 725 at its lower end and in the normal condition of the machine the lug 724 lies under one end of a lever 726 pivoted at 727 on a shaft carried in the side plates of the frame and having pivoted to its other end a depending lug 728. Also pivoted on the shaft 727 is a similar lever 729 having a lug 730. The depending finger 723 however is normally in a position such that its lug 725 is clear of the lever 729.

In order to maintain the two fingers 722, 723 in their relative positions each is connected by means of a link 731, 732 respectively to opposite ends of a lever 733 secured to a shaft 734 to which is also secured an arm 735 pivoted to the link 384 shown in Figure 41 of British patent specification No. 440,180. As described in this prior British specification this link 384 is moved to the right by depression of the clearance key 435.

When the clearance key is not depressed the lever 733 and associated parts are in the position shown in Fig. 6 and consequently the finger 722 is disposed in vertical alignment with the rod 719 so that its lug 724 is beneath the lever 726. The lug 728 of this lever 726 engages with the cam 720 so that with this position of the parts, when the handle of the machine is pulled forwardly and the shaft 232 rocks in an anticlockwise direction the vertical portion 720a of cam 720 strikes the depending lug 728 of lever 726 and swings this lug to one side without lifting it; therefore on the forward stroke of the operating handle the wheels 716 remain out of engagement with the actuators.

On the return stroke of the operating handle however, the shaft 232 rocks in a clockwise direction and as the cam 720 returns its inclined face 720b engages with the lug 728. This engagement of the cam 720 with the lug 728 tends to swing the latter counterclockwise about its pivot but such movement is prevented by a projection 726a on the lever 726 which acts as an abutment for the lug 728 so that the cam 720 lifts the lug 728 thereby rocking the lever 726 which by engaging the lug 724 pulls down the rod 719 whereby the register wheels 715 are moved into engagement with the actuators 749 to 752.

This action of course takes place after the actuators have been set and the cam 720 has a contour of sufficient length to maintain the wheels 715 in engagement with the actuators while the latter are being restored to zero by the lifting of the restoring bail 709.

After the actuators 749 to 752 and so on have been restored thereby transferring to the register wheels 715 the amount to which the actuators were set the cam 720 leaves the lug 728 whereupon the spring 719a lifts the rod 719 thereby returning the wheels 715 laterally to the disengaged position.

After this operation, cam 708 returns the stepped plates 601 to 614, etc., to the left to their normal position. The machine is now at rest with all its parts in their normal position with the exception of the register wheels which hold the product of the calculation made. In order to clear the register wheels in readiness for another calculation the clearance key 435 described in British patent specification No. 440,180 is depressed and then the operating handle of the machine is pulled forwardly and allowed to return by means of its spring.

Depression of the clearance key 435 pushes the link 384 to the right and thereby rocks the lever 733 in a counterclockwise direction. This movement of the lever 733 swings the finger 722 counterclockwise so that its lug 724 is out of the path of the lever 726 and simultaneously swings the finger 723 clockwise so as to bring its lug 725 below the lever 729.

As the shaft 232 now rocks counterclockwise the inclined portion 721b of the cam 721 strikes the depending lug 730 and tends to rock this lug in a clockwise direction. This lug 730 however carries a projection 736 which engages a projection 729a on the lever 729 and prevents relative movement between this lever and the lug 730. Consequently the cam 721 lifts the lug 730 and through the action of lever 729 and finger 723 pulls the rod 719 downwards thereby bringing the register wheels 715 into engagement with the actuator racks.

The inclined portion 721b of cam 721 is so placed that it pulls the rod 719 downwardly before the cam 715 has released the bail 709 to permit the actuators to descend and while the stepped plates associated with these actuators are in their normal positions to the left.

During this operation these accumulator plates 601 and 602 and so on are held in their normal positions by the latch 282 which is released by actuation of the keys during multiplying operations but not by the clearance key 435.

When the bail 709 is thus lowered the actuators descend and in so doing turn the register wheels backwards until the latter reach zero.

Any known form of register adapted for sterling calculations may be used. As will be well understood the backward rotation of the register wheels will be arrested by the usual form of transfer tooth engaging the usual form of transfer pawl when zero is reached.

It will be now understood why the additional deep slots 660a, 661a, 662a and so on are provided in the final result plates 601, 603, 606 and 609 and so on. If these slots were not provided the projection 649a for example, on the one eighth of a penny actuator 649 would normally be located over the zero step of the steps 660 for the plate 601 and consequently the actuator 649 would be unable to descend in order to restore the corresponding register wheel to zero. The provision of the additional slot 660a in the plate 601 permits the descent of the coresponding actuator 649 for the purpose of restoring its corresponding register wheel to zero. The provision of this slot 660a however, necessitates the plate 601 making one step movement even when the amount to be set up on this plate 601 is zero.

When a transfer of one unit has occurred from one denomination to the other as in the case of pence to shillings, or units of shillings to tens of shillings, the final product plate in the denomination to which the transfer has occurred will be one step in advance of the adjacent plate in the same denomination.

In order to permit restoration of the final product plates to their normal positions relatively to the adjacent plates before all the plates commence to return, the restoring bar is constructed in the following manner.

Mounted on the upper surface of the restoring bar 705 is a supplementary restoring bar 737 having slots 738 engaging pins 739 projecting from the main restoring bar 705 (Fig. 10). The length of the slots 738 is such that the supplementary restoring bar 737 can advance with respect to the restoring bar 705 a distance equal to the width of one of the steps in the stepped plates. The supplementary restoring bar 737 carries a lug 740 at each end on which is pivoted a latch 741 having a tail 742. When the supplementary restoring bar 737 is in its rearmost position its front edge is flush with the front edge of the main restoring bar 705 and the latches 741 are then resting on the tops of lugs 743 formed at each end of the bar 705. As the restoring bar 705 is moved rearwardly, that is to say to the right in Fig. 1 by means of the arms 707 and cam 708, the rear edge of the supplementary restoring bar 737 engages a cross-rod 744 (Fig. 1) carried between the side plates of the frame. This crossrod is disposed in such a position that it is engaged by the supplementary restoring bar when the main restoring bar 705 reaches a position which is one step in advance of its rearmost position. Consequently as the restoring bar 705 travels still further rearwardly the supplementary bar 737 is held back so that the bar 705 moves rearwardly one step relatively to the bar 737 and the latches 741 drop off the lugs 743 and, by engaging over these lugs, retain the bar 737 one step in advance of the bar 705.

The stepped plates other than the final product plates are provided with notches 745 in their rear edges, that is to say, the plates 602, 604, 605, 607, 608, 610, 611, 613, 614 and the corresponding plates in higher denominations.

When the restoring bar returns to the left the bar 737 enters the notches 745 in the rear edges of the plates 602, 604 and so on which are projecting beyond the other plates after moving one step engages the rear edges of the other plates 602, 604 and so on. At this moment the bar 705 engages the rear edges of the plates 601, 603 and so on, so that the two bars 705, 737 return all the plates simultaneously.

Since the bar 737 is in front of the bar 705 the plates 602, 604, and so on will reach the end of their return movement one step in advance of the plates 601, 603 and so on and just before the plates 602, 604 and so on reach the end of their travel the tails 742 of the latches 741 engage a cross bar 746 whereby the latches lift clear of the lugs 743. The further movement of the bar 705 completes the return of the plates 601, 603 and so on, and during this movement the bar 705 moves relatively to bar 737 which is held stationary by engagement with the rear edges of the plates 602, 604 and so on which are fully restored. The relative movement of bars 705 and 737 brings the lugs 743 once again below the latches 741.

It will be remembered that a transfer from the tens of shillings plate 609 to the units of pounds plate 612 is effected by means of the arm 686, sleeve 687 and arm 692 controlling the vertical position of the slide 688 which through pin 693 and slot 693a controls the movement of plate 612 relative to plate 611 which carries the slide 688.

If the lug 685 has moved up on to one of the steps 657 to transfer one unit to the pounds, and if also the plate 609 were displaced to the right to a greater extent than the plate 612 it would be impossible to return the plates since the restoring bar 705 would strike the plate 609 first and through the connection, 686, 687, 692, 691, 688, 693, 693a would push the plate 612 to the left in advance of plate 609. Then when plate 612 reached its limiting position to the left the restoring bar would be unable to move any further since plate 609 would be held back by the engagement of lug 685 with the step 657.

In order to obviate this occurrence means is provided for returning the arm 686 to its lowermost position before the plate 609 commences to move back to its normal position.

For this purpose a lever 747 (Fig. 9) is provided, which is secured to a shaft 748 rotatably mounted on the side plates 616, and having its end 749 resting on the top of the slide 688. Also secured to shaft 748 is a lever 750 pivoted to a vertical rod 751 sliding on guides attached to one side plate 616 and carrying at its lower end a roller 752 resting on a cam 753 carried on a slide 754 pivoted to one of the arms 707 which operate the restoring bar 705.

When the plate 612 is in its normal position to the left the roller 752 is at the right hand end of the cam 753. Then when the restoring bar moves to the right all the plates with the exception of the plate 612 are free to move to the right also.

The horizontal part of the cam 753 is of such a length that the lever 747 prevents the slide 688 from rising until the restoring bar 705 has moved to the right sufficiently to permit all the sliding plates the maximum movement of which they are capable. The bar 705 then moves still further to the right, whereupon the roller 752 rides down the inclined portion of the cam 753 and permits the slide 688 to rise to the position determined by the particular tooth 657 with which the lug 685 engages.

On the return stroke of the restoring bar 705 the inclined part of cam 753 lifts the rod 751 and through the levers 748 and 747 pushes the slide 688 downwards thereby returning the arm 686 to its lowermost position. At the same time the pin 693 acting on the cam slot 693a returns the plate 612 to its normal position relative to the plate 611, whereupon the restoring bars 705, 737 return both plates 611, 612 to their normal positions in the machine together with all the other plates.

If desired means may be provided for recording the products obtained by means of the mechanism according to the invention. For example the actuator racks 649 to 652 and so on may carry type or may serve to set punches to punch the product in a statistical record card or the like.

What I claim is:

1. Mechanism for accumulating the partial products obtained from the multiplication of two factors comprising in combination a frame, a plurality of accumulator plates pertaining to a single denomination of the product, said plates being slidably mounted in said frame, a settable stop for one of said plates, said stop being mounted in the frame, a settable stop for the adjacent plate, said second mentioned stop being carried on said first mentioned plate, means for setting said stops and means for maintaining the stop which is carried on said first mentioned plate in operative relation with the setting means irrespective of the position of the plate on which said stop is carried.

2. Mechanism for accumulating the partial products obtained from the multiplication of two factors in a machine including a series of denominational partial product elements, comprising in combination a frame, three accumulator plates pertaining to a single denomination of the product, a settable stop for the first of said plates, said stop being carried in the frame, a settable stop for the second of said plates, said second stop being carried by said first plate, a settable stop for the third of said plates, said third stop being carried by said second plate, means for setting said stops under the control of the partial product elements, spring means for moving said plates up to their stops, means for maintaining the second and third stops in operative relation with the setting means irrespective of the position of the plate on which the stop is carried, a plurality of numerical abutments carried on the third plate, said abutments representing all possible digits of the product in the denomination to which said plate relates, a reading element mounted in the frame, spring means for moving said reading element until arrested by one of said numerical abutments, whereby said reading element receives a setting, a receiving wheel, and means for transferring to said receiving wheel the setting of said reading element.

3. Mechanism according to claim 2 for accumulating partial products wherein the setting means for the third stop comprises an arm pivoted to said stop, a lower denominational accumulator plate, a second arm, a cam on said lower denominational plate disposed to rock said second arm when said plate moves beyond the highest digit in its denomination, and an operative connection between the two said arms whereby when said second arm is rocked, said first arm is also rocked and moves said third stop.

4. Mechanism for accumulating the partial products of the multiplication of sterling amounts comprising a frame, and, in the units of pounds denomination a transfer plate for the reception of amounts transferred from the tens of shillings denomination, said transfer plate being slidably mounted in said frame, a settable stop for said transfer plate, a final product plate in the tens of shillings denomination, said final product plate being formed with steps each representing two units of movement of said plate, an arm pivoted to said settable stop, a second arm co-operating with the steps in said tens of shillings plate, an operative connection between said arms and means for returning said arms to their normal position before the tens of shillings plate is returned to its normal position.

ERNEST CHARLES McCLURE.